United States Patent Office 3,512,534
Patented May 19, 1970

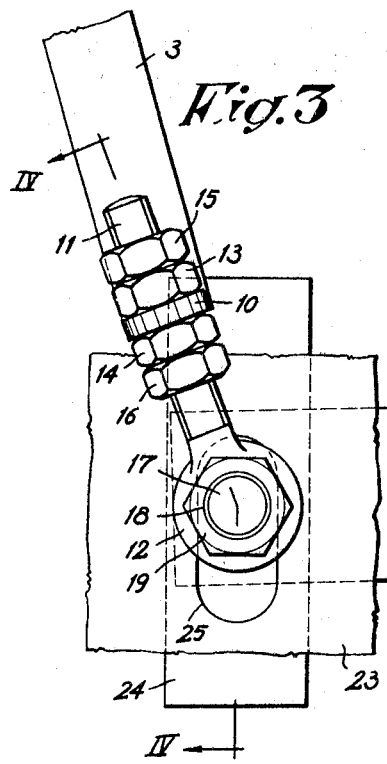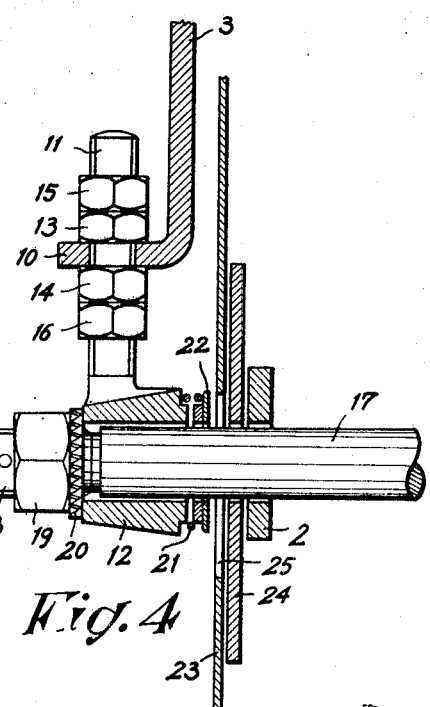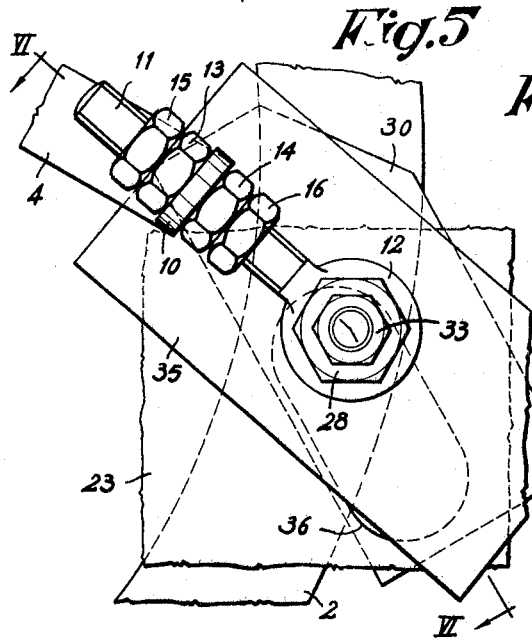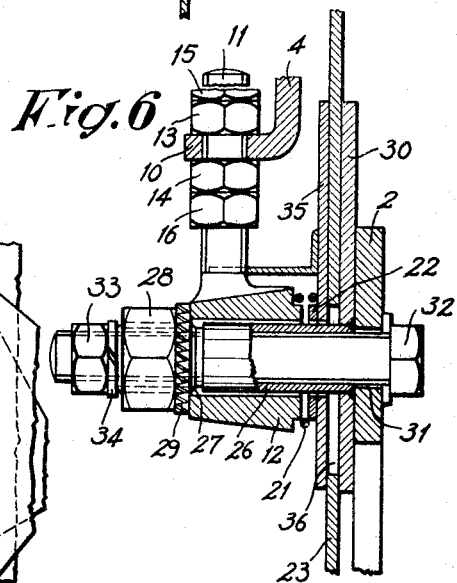

---

3,512,534
SUSPENSION OF THE CONCAVE OF COMBINES
Edward W. Rowland-Hill, Oostende, Gerard O. Jacobs, Ichtegem, and François Van Herpe, Gent, Belgium, assignors to Clayson N.V., Zedelgem, Belgium, a company of Belgium
Filed Dec. 18, 1967, Ser. No. 691,416
Claims priority, application Belgium, Dec. 19, 1966, 46,343
Int. Cl. A01f 12/28
U.S. Cl. 130—27　　　　　　　　　　　　　　　　7 Claims

ABSTRACT OF THE DISCLOSURE

Improved suspension of the concave of combines, whereby, after having adjusted the distance between threshing drum and concave, the latter can be fixed to the frame of the combine.

---

The present invention concerns an improved suspension of the concave of combines.

It is known that the concave of combines is usually suspended by adjusting rods, the latter being controllable via an appropriate lever mechanism from the steering position, to adjust the distance between the threshing drum and the concave.

An important disadvantage of this known suspension is that the forces exercised on the concave when threshing are directly transmitted to these rods.

This disadvantage is the worse when the crops to be threshed are heavy, so that for instance when threshing corn, such a load can be so disadvantageous that disformations and even breakage may occur, either of the concave or of the above mentioned adjusting rods.

The object of the present invention is an improved suspension of such a concave, particularly conceived to transmit the above mentioned forces exercised on the concave during threshing, on a fixed part of the combine, for instance the frame thereof, and not as was the case up to now, on the adjusting rods in which the above mentioned concave is suspended.

The above mentioned and other advantages are obtained by an improved suspension of the concave of combines, of the type in which this concave is connected with suspension elements passing through appropriate conduits which are provided in the fixed part of the combine and on which these suspension elements are connected by means of adjusting rods, comprising means allowing that, after adjusting the suitable distance between the threshing drum and the concave, the concave can rigidly be connected to the frame of the combine.

To clearly show the characteristics of the present invention some preferred embodiments thereof are described hereafter by way of example only and without any limiting character, with reference to the appended drawings in which:

FIG. 1 is a schematical side view of a combine in which the concave is suspended according to the present invention;

FIG. 2 schematically shows, on a larger scale the improved suspension of the concave according to the invention;

FIG. 3 shows on a larger scale the part which is indicated by $F_3$ in FIG. 2;

FIG. 4 is a section according to the line IV—IV of FIG. 3;

FIG. 5 shows a variation of FIG. 3, in this case of the part which is indicated by $F_5$ in FIG. 2;

FIG. 6 is a section according to line VI—VI of FIG. 5.

Figure 1:
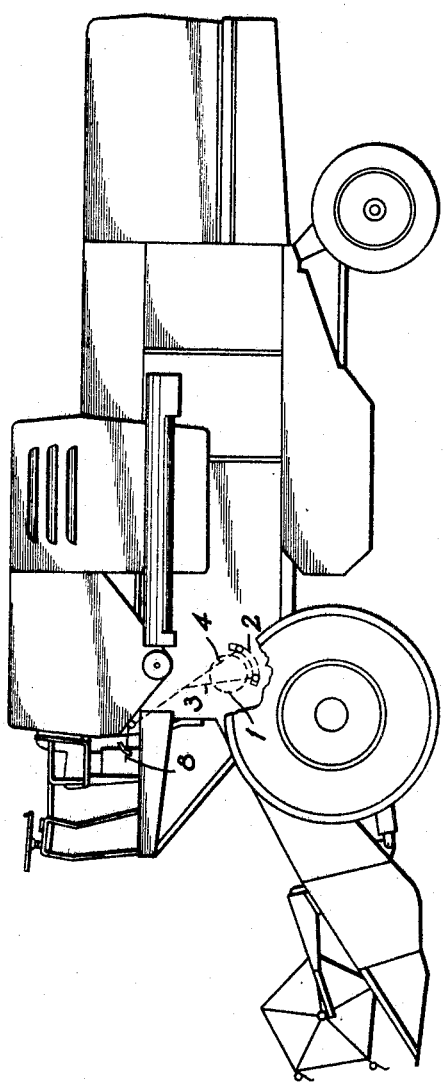
Figure 2:
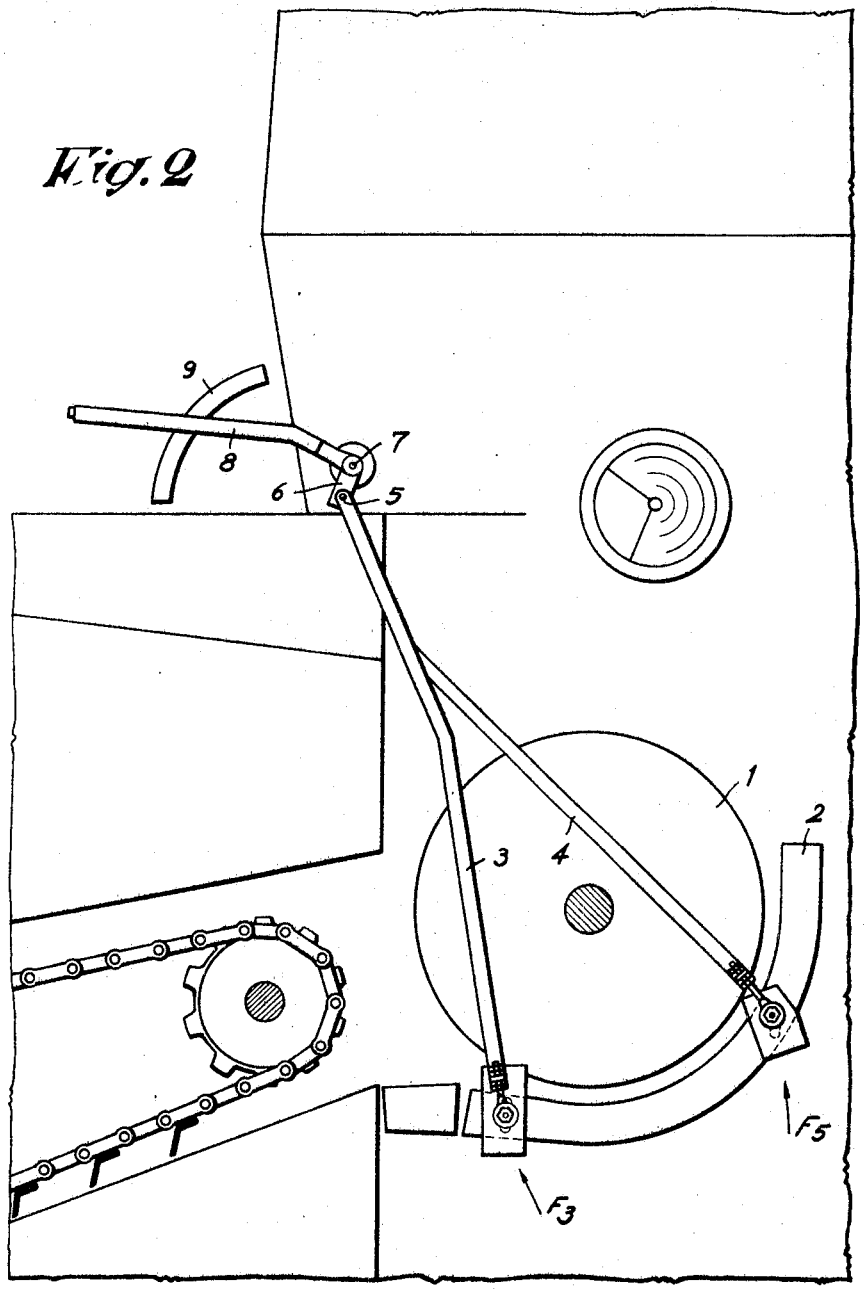

As shown in the FIGS. 1 and 2, a concave 2 is provided under the threshing drum 1, said concave being connected on two points thereof to rods, respectively 3–4, the other end of these rods being connected, via a pivot 5, with a lever 6 mounted on a shaft 7 on which a second lever 8 is fixed, the latter co-operating in a known way with a locking device 9.

The shaft 7 on which the single lever 8 is mounted extends on the whole width of the frame of the machine, the elements 3–6 being provided on each side of the concave 2.

The elements 3–9 are known per se and constitute the so called adjusting rods allowing to adjust the distance between said threshing drum 1 and said concave 2.

Up to now the connection of said rods 3 and 4 to the concave 2 consisted simply in a pivot, bolt or similar, these pivots or bolts being suitably guided in grooves, provided in a fixed part of the combine so that when the above mentioned control lever 9 is operated, the concave is brought nearer to or farther from the threshing.

It will be noted that the forces exercised on the concave, are thus always directly transmitted to the above mentioned adjusting rods 3 and 4, which are sometimes heavily loaded.

The FIGS. 3 and 4 show a first embodiment allowing to transmit the above mentioned forces to a fixed part, for instance the frame of the combine.

To this end, the rods 3 and 4 are provided with a bent part 10 through which extends the threaded part 11 of an eye-bolt 12. The actual connection of an eye-bolt 12 with the corresponding adjusting rod consists of nuts, respectively 13 and 14, located on both sides of the above mentioned bent part, and of counter nuts, respectively 15 and 16.

The above mentioned eye-bolts 12 are each freely mounted on a rod 17 which is connected in an appropriate way with the concave 2, and the end of which being provided with a threaded part 18 co-operating with a nut 18.

A spring loaded washer 20 is provided between the nut 19 and the eye-bolt 12, while the eye-bolt 12, under the influence of a spring 21, is always pushed towards the above mentioned nut 19. The spring 21 rests on a supporting washer 22 which is thus applied against the frame plate 23.

Between the threshing drum 1 and the above mentioned frame plate 23 is provided a tension plate 24 having a thickness determined in function of the normal distance between the concave 2 and the above mentioned plate 23.

The rod 17 finally passes through a slot 25 provided in the frame plate 23, said slots 25 guide the concave 2 when said command lever 9 is operated.

The tension plate 24 and the supporting washer 22 have larger dimensions than the slots 25, so as to always cover the latter. After having suitably adjusted the distance between the threshing drum and concave in function of the kind of crop to be threshed, the nuts 19 have only to be tensioned, whereby the eye-bolt 12 is applied against the frame plate 23 via the supporting washer 22 and against the action of said spring 21.

In this way, the forces exercised on the concave during threshing, are directly transmitted to the frame of the machine, so that the above mentioned adjusting rods remain unloaded.

In FIGS. 5 and 6 is shown a modified embodiment of the parts shown in FIGS. 3 and 4, said modification being shown by way of example as applied to the part indicated by $F_5$ in FIG. 2.

In this case, the above mentioned rods 3 and 4 are also provided with a bent end 10 which is connected by means of the above mentioned nuts 13–16 to an eye-bolt 12.

The eye-bolt 12 is here mounted around a bushing 26, one end of which being provided with a screw thread 27 cooperating with a nut 28. An appropriate spring washer 29 is provided between the nut 28 and said eye-bolt 12.

The other end of said bushing 26 is fixed to a tension plate 30, located between the side of the above mentioned threshing drum 2 and the frame plates 23, and which can be compared with the above mentioned plate 24 of the previously described embodiment.

The concave 2 is provided with an opening 31 through which passes a bolt 32 extending through the above mentioned bushing 26, said bolt co-operating with a connecting nut 33 which, via a spring washer 34, pushes against the free end of the above mentioned bushing 26 so that the latter is rigidly fixed to the concave 2.

In this case the eye-bolt 12 is also influenced by a spring 21 acting on a supporting washer 22, the latter pushing against an additional tension plate 35. This plate 35 is further so shaped that, in any which position of the concave, it always covers the opening 36 provided in the frame or support frame plate 23 of the combine, so as to allow and check an appropriate displacement of the bushing 26 relative to this plate 23.

As in the previously described embodiment it is sufficient to adjust the correct distance between the threshing drum 1 and the concave 2, by means of the above mentioned command lever 9, whereafter the nuts 28 of each of the adjusting rods 3 and 4 are tensioned in such a way that the corresponding eye-bolt is pushed against the washer 22, the plate 35 being thus also pushed against the frame plate 23 so that said eye-bolt 12 is rigidly fixed in this position to the plate 23, the forces exercised on the concave being in this case also transmitted to the frame of the combine.

In this manner a suspension for a concave on combines is obtained which allows, on one hand, a suitable adjustment of the distance between the threshing drum and the concave and, on the other hand, to very simply connect this concave to a fixed part of the combines, so that the stresses occurring during threshing are directly transmitted to the frame.

The improved suspension of a concave according to this invention is in no way limited to the embodiments described as an example and shown in the drawings, but this suspension can be realized in all shapes and dimensions, within the scope of the present invention.

What I claim is:

1. On a combine having a frame with an elongated slot, a concave linkage means for positioning said concave: a support rod connected to said concave and extending through said slot, supporting means connected to said linkage means and said support rod on the opposite side of said frame from said concave, a plate having an area coextensive with said slot between said support means and said concave, clamping means including resilient means on said support rod for holding said plate against said slot and for longitudinally shifting said supporting means with respect to said rod against the pressure of said resilient means to secure said supporting means and concave in fixed relation to said frame.

2. On a combine as set forth in claim 1, wherein said clamping means comprises fastening means on said support rod on the opposite side of said supporting means from said frame and resilient means between said fastening means and said supporting means to press said supporting means and said concave towards said frame.

3. On a combine as set forth in claim 2, wherein said clamping means includes second resilient means between said supporting means and said frame to urge said supporting means against said first resilient means.

4. On a combine as set forth in claim 3, wherein said fastening means is a threaded portion on said rod with a nut thereon and said first resilient means is a spring washer and said second resilient means is a spiral spring.

5. On a combine as set forth in claim 1, wherein said plate is on the same side of said frame as said supporting means and said support rod comprises a bushing with a plate member between said concave and frame and a bolt connected to said concave and extending through said bushing, said clamping means comprises first and second fastening means, said first fastening means being on said bushing on the opposite side of said supporting means from said frame and said second fastening means being on the opposite side of said first fastening means from said supporting means, said resilient means is positioned between said first fastening means and said supporting means and under pressure by said first fastening means for firmly pressing said plate and plate member against said frame for a firm support of said concave on said frame, and said second fastening means loading against said bushing to securely affix said concave in a desired position.

6. On a combine as set forth in claim 5, wherein said clamping means includes a second resilient means between said supporting means and said plate to urge said supporting means against said first resilient means and said plate against said frame.

7. On a combine as set forth in claim 5, wherein said first and second fastening means are threaded portions on said bushing and bolt respectively with nuts thereon, said first resilient means is a spring washer and said second resilient means is a spiral spring.

References Cited

UNITED STATES PATENTS 3,156,245  11/1964  Hobbs _____ 130—27.11

FOREIGN PATENTS 600,735  6/1933  Germany.
98,894  5/1940  Sweden.
70,179  10/1949  Denmark.

ANTONIO F. GUIDA, Primary Examiner